INVENTORS
CHARLES J. STARNER
THEODORE N. NEWMAN
BY Harry Tonick
ATTORNEY

INVENTORS
CHARLES J. STARNER
THEODORE N. NEWMAN
BY
Harry Tunick
ATTORNEY

Feb. 6, 1951 C. J. STARNER ET AL 2,540,634

CONCENTRIC LINE RESONATOR CIRCUIT AND MEANS FOR COUPLING THERETO

Filed Nov. 15, 1947 3 Sheets-Sheet 3

INVENTORS
CHARLES J. STARNER
THEODORE N. NEWMAN
BY Harry Tunick
ATTORNEY

Patented Feb. 6, 1951 2,540,634

UNITED STATES PATENT OFFICE 2,540,634

CONCENTRIC LINE RESONATOR CIRCUIT AND MEANS FOR COUPLING THERETO

Charles J. Starner, Haddonfield, N. J., and Theodore N. Newman, New York, N. Y., assignors to Radio Corporation of America, a corporation of Delaware Application November 15, 1947, Serial No. 786,256

4 Claims. (Cl. 178—44)

This invention relates to a concentric line resonator circuit, particularly for use with high power amplifier circuits in transmitters having power ratings of the order of 25 to 50 kilowatts.

Various features of the present invention lie in the novel mechanical construction of the concentric line resonator circuit and the means for tuning the resonator over a relatively wide frequency range. The novel mechanical construction includes the use of an elongated shorting or tuning bar which is connected to the outer surface of the inner conductor of the concentric line by means of spring contacts, but spaced from the inner surface of the outer conductor of the concentric line in order to provide a sliding capacity reactance between the two conductors of the line resonator. The tuning bar, in effect, provides a low impedance for radio frequency current and serves, among other things, to electrically lengthen the line resonator. A feature of this tuning bar lies in the use of annular contact springs near the two ends of the bar for contacting the inner conductor of the line resonator. One of these annular contact springs is designed to be removable for enabling the resonator to function over a wider range of frequencies than obtainable with the use of both annular contact springs. Another feature resides in the use of the output coupling loop which is rotatably adjustable over a range of angles and has in circuit therewith an adjustable concentric line capacitor whose inner conductor is securely fastened and rotatable with the output loop. This concentric line condenser is so constructed and arranged that the capacitance thereof is constant for any fixed adjustment over all angles of movement of the output coupling loop. Other features of the invention lie in the construction which enables the amplifier tube to be supported by and mounted in the inner conductor of the concentric line, the means for moving the slidable tuning bar over a portion of the length of the concentric line resonator, the arrangement for supporting the inner conductor of the concentric line resonator, and the arrangement for supplying anode polarizing potential to the amplifier tube.

A more detailed description of the invention follows in conjunction with a drawing wherein.

Figure 1:
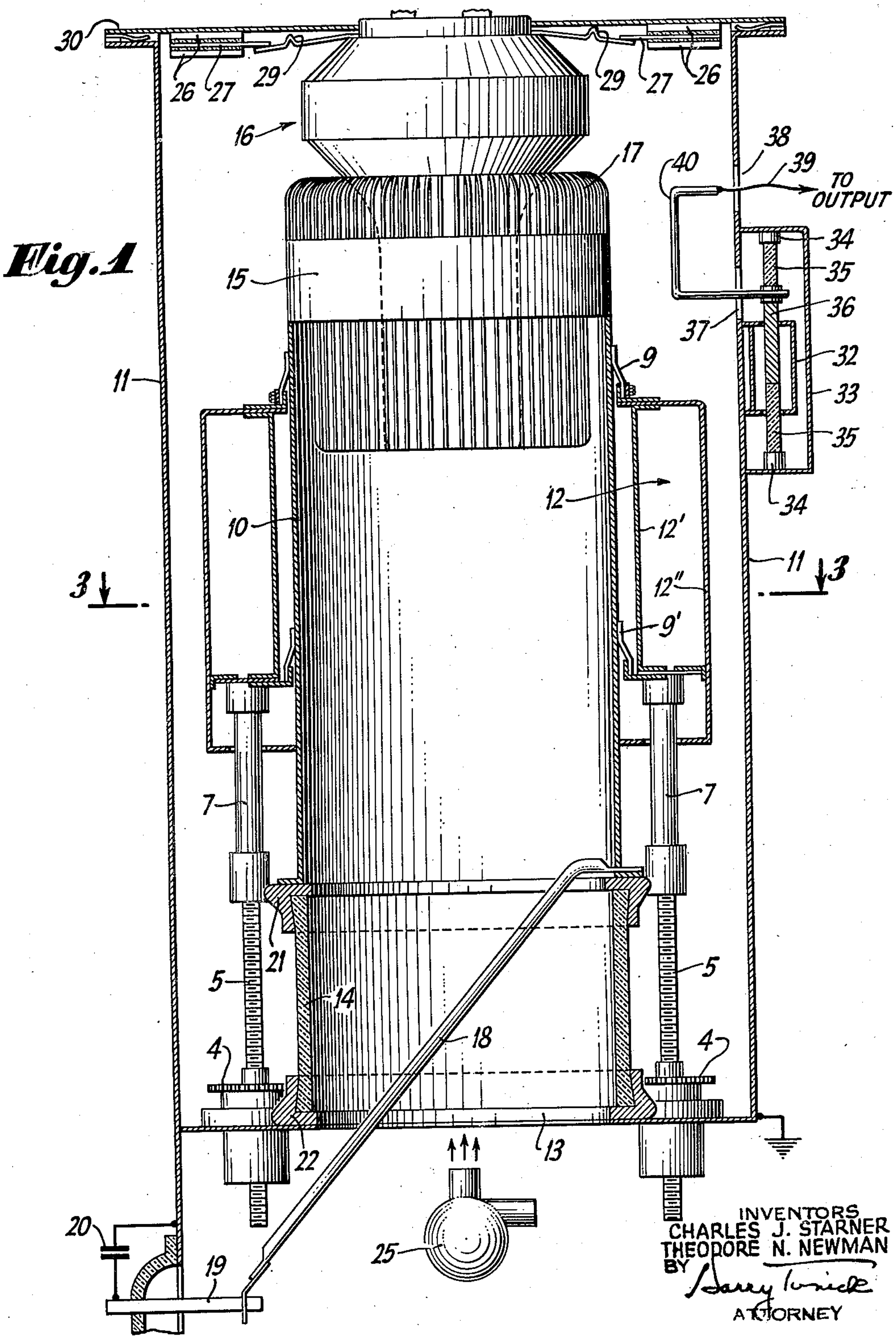
Fig. 1 illustrates a view, partly in cross section and partly in elevation, of the concentric line resonator circuit and associated apparatus, constituting the invention.

Referring to the various figures of the drawing, wherein like parts are represented by like reference characters, there is shown a concentric line resonator comprising an inner conductor 10 and an outer conductor 11 having located therebetween an annular tuning or shorting bar generally indicated by 12. The outer conductor 11 of the concentric line resonator is square in shape and supports the entire amplifier circuit. The inner conductor 10 is mounted on a ceramic insulated socket 14, in turn, mounted on the base 13 of the outer conductor. The inner conductor 10 is cylindrical in form and supports at its top the amplifier tube 16 whose anode extends into the interior of the inner hollow conductor as shown. More specifically, the anode of the amplifier tube is shown generally in dotted lines, while the metallic cooling fins 17 which are mechanically and electrically connected to the anode also lie within the interior of the inner conductor 10, although the upper portion forms the continuation of the inner conductor and acts as an elongation of the physical length of the inner conductor. A metallic band 15 surrounds the fins 17 and serves to mount the fins and amplifier tube upon the upper end of the inner conductor. In practice, the fins are provided with a shoulder adjacent the lower edge of the band 15 which acts as a support for the amplifier tube 16.

Anode polarizing potential is supplied to the anode of the amplifier tube 16 by means of a copper bus or bar 18 one end of which is connected to the lower end of the inner conductor 10 and whose other end is connected to a metallic stud 19 which, in turn, is connected to the source of unidirectional anode supply. The entire length of the bus 18 and metallic stud 19 may be of the order of one-quarter of a wavelength at the mean operating frequency, thus acting as an inductance or choke coil for preventing radio frequency current from entering the source. A capacitor 20 connects the bus 19 to the grounded outer conductor 11 for bypassing to ground any radio frequency components which may be present in the bus 19. The capacitor 20 and the connections 18 and 19 may be considered as a filter.

It should be noted that the upper end of the ceramic socket 14 is provided with an annular metallic ring 21 upon which the inner conductor 10 rests. This annular ring 21 serves to rigidly fasten the inner conductor 10 to the ceramic socket 14. Similarly, another metallic ring 22 at the lower end of the ceramic socket 14 serves rigidly to secure the ceramic socket to the base 13 of the outer conductor 11. In practice, the base 13 sets upon a plenum chamber from which air is blown from a blower 25 through the inner conductor 10 for cooling the anode of the amplifier tube 16. The base 13 is provided with a large aperture for enabling cooling air to pass through ceramic socket 14 and through the interior of the inner conductor 10 to the cooling fins 17 and from the cooling fins 17 upward out of the top or cover for the outer conductor 11.

Figure 2:
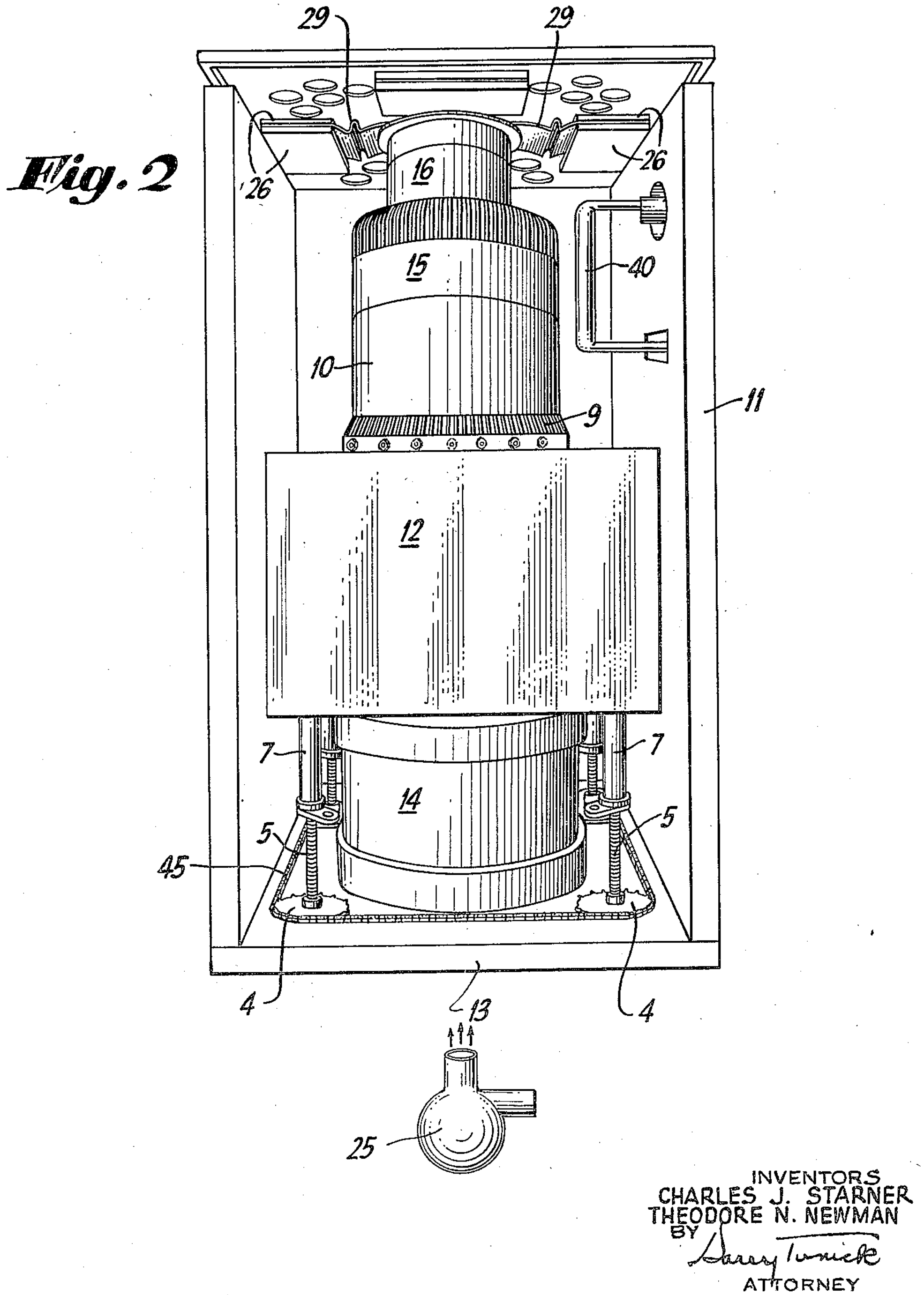
Fig. 2 is a front elevation view of the apparatus of Fig. 1, with one wall of the outer conductor and concentric line resonator removed.
Figure 3:
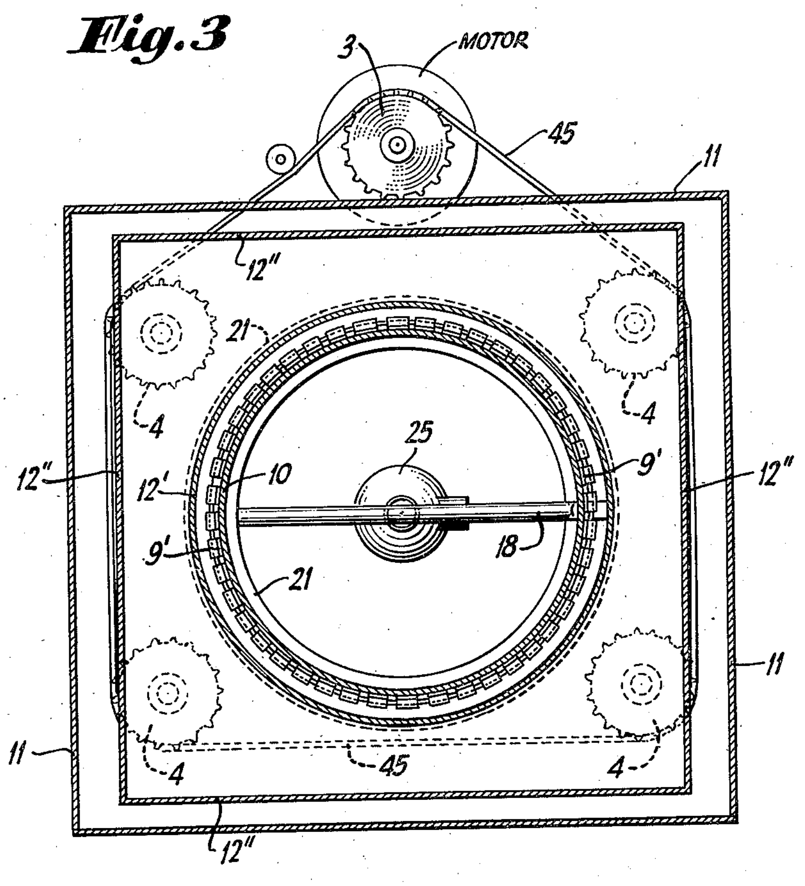
Fig. 3 is a cross section of Figs. 1 and 2 taken along the lines 3—3, but with the front wall replaced.

The tuning of the concentric line resonator is accomplished by the tuning bar 12 which is square in shape as seen looking down from the amplifier tube 16. This square construction is hollow in its center for enabling the inner conductor 10 of the concentric line resonator to pass therethrough. Note Figs. 2 and 3. More specifically, the tuning bar 12 is an enclosed hollow chamber having an inner circular metallic wall 12′ and an outer square metallic wall 12″. Attached to the upper part of the tuning bar 12 is an annulus of resilient spring-like contact fingers 9 which extend around the outer surface of the inner conductor 10 and make electrical contact therewith. Attached to the lower part of the tuning bar 12 is a similar annulus of resilient spring-like contact fingers 9′ which also surround the outer surface of the inner conductor 10 and make electrical contact therewith. These contact fingers 9 and 9′ are slidable with the tuning bar over the length of the inner conductor 10, as the tuning bar is moved up or down for adjusting the frequency of the concentric line resonator. The outer wall 12″ of the tuning bar extends below the wall 12′ so as to provide a square skirt-like portion at the bottom of the tuning bar and thus furnish additional capacity area for the tuning bar with respect to the outer conductor 11 of the concentric line resonator. The tuning bar 12 is supported on four ceramic insulators 7 in turn, mounted on lead screws 5. The lead screws 5 are driven in unicontrol fashion in a vertical direction, by means of an endless chain 45 which engages sprocket wheels 4 in turn, actuating the lead screws. The endless chain is controlled by a motor through the intermediary of motor sprocket 3, as shown in more detail in Fig. 3.

It will thus be seen that movement of the endless chain 45 will move the tuning bar 12 up or down depending upon the direction of movement of the sprocket 3.

The tuning bar, in effect, is hollow in its interior. The outer wall 12″ of this tuning bar is spaced from the outer conductor 11 of the concentric line resonator a sufficient amount so as to provide a low capacitive reactance between the tuning bar and the outer conductor for radio frequency currents. This capacitive reactance is, however, of sufficient value to materially lengthen the effective length of the concentric line resonator, electrically, so as to allow the concentric line to tune to a higher frequency than in the case of a direct connection between the inner and outer conductors of the concentric line resonator. It should be noted that the outer wall 12″ is directly connected to the inner wall 12′ at the top of the ceramic insulators 7. The use of two sets of similar annular contact fingers 9 and 9′, one at the top of the shorting bar and one at the bottom of the shorting bar, enables obtaining a relatively wide frequency range to tune while still maintaining the physical length of the concentric line resonator short at the lower frequency limit. This is done by making the upper annular contact fingers 9 removable. If the upper set of annular contact fingers 9 is removed, there will exist a section of short-circuited line in the inner conductor 10. This short-circuited section is constituted by the circular inner wall 12′ of the tuning bar, the lower set of annular fingers 9′, and that portion of the outer surface of the inner conductor 10 which is adjacent but spaced from the inner wall 12′ of the tuning bar. Seated otherwise, the length of the short-circuited line with the contact fingers 9 removed is the length of the tuning bar 12 disregarding the square portion. In effect, this section of shorting line is an inductive reactance while the open section of the line constituted by the outer wall 12″ of the tuning bar and adjacent but spaced portion of the outer conductor 10 is a capacity reactance of approximately the same value as the short-circuited section of line but opposite in sign, at the lower frequency range. These two reactances formed by the tuning bar 12′ and the inner and outer conductors of the concentric line are effectively in series between the inner and the outer conductors of the concentric line, and their lengths are so proportioned primarily by the length of the tuning bar 12 that substantially zero reactance exists between the inner and outer conductors of the concentric line resonator at the location of the tuning bar for frequencies at the lower frequency limit.

The outer conductor 11 of the concentric line resonator is shown provided with a cover plate 30 which has apertures for enabling the air blown through the fins 17 to escape from the concentric line resonator. The amplifier tube 16 is shown connected in a grounded grid circuit. The grid of the amplifier tube is connected at four points symmetrically positioned around the tube, via flexible leads 29 to radio frequency bypass condensers so as to ground the grid to the grounded outer conductor 11. It should be noted that each flexible grid conductor 29 is connected to a metallic plate 27 which is sandwiched between two other metallic plates 26, 26 with intermediate mica spacers. The two outer metallic plates 26, 26 are connected directly to the grounded outer conductor 11, thus providing a radio frequency bypass condenser construction between the grounded outer conductor 11 of the concentric line resonator and the grid of the amplifier tube 16.

Input energy is supplied in a manner, not shown, to the cathode of the amplifier tube 16.

In order to derive output energy from the concentric line resonator there is provided an output coupling loop 40 which is located in the interior of the concentric line resonator and is rotatable in a vertical position, as shown, over an angular range or approximately sixty degrees. One terminal of the output coupling loop 40 is connected through an aperture 38 in the outer conductor 11 to a flexible lead 39 which connects with a suitable utilization circuit located externally of the concentric line resonator. The other terminal of the output coupling loop 40 passes through another aperture 37 in the outer conductor and is rigidly joined to a metallic rod 36 forming the inner conductor of a concentric line capacitor. This metallic rod 36 is mechanically joined at both ends to insulating extensions 35, in turn, supported by bearings 34 mounted on opposite sides of a metal cover 33. It will thus be seen that the loop 40 is rotatable in order to obtain a desired amount of output power from the amplifier, and that the rod 36 which is rigidly fastened thereto will also rotate. Surrounding the rod 36 is a metallic cylinder 32 which is capacitively coupled to this rod and grounded to the outer conductor 11. Movement of the metallic cylinder 32 in a vertical direction will either increase or decrease the capacitive reactance between rod 36, and the cylinder 32 depending upon, more or less, the extent to which the rod 36 is positioned within the interior of the element 32. An important feature of this construction is that for any adjustment of the concentric line capacitor 36, 32 there will be a constant capacitive reactance for all annular positions of the output coupling loop 40. This capacitive reactance is preferably adjusted to tune out the inductance of the coupling loop 40.

An advantage of the present invention is that the construction is completely shielded for radiated radio frequency energy, and there is a negligible leakage to external circuits.

In one embodiment of the invention actually tried out in practice in a frequency modulation transmitter having a power rating of the order of 50 kilowatts, the tuning range of the concentric line resonator was from 88 megacycles to 108 megacycles over the range of movement of the tuning bar 12. With the upper and lower annular spring contacts 9 and 9′ respectively in a position against the inner conductor of the concentric line resonator, the tuning range was approximately 98 megacycles to 108 megacycles over the range of movement of the tuning bar. With the upper spring contacts 9 of the tuning bar removed, however, the tuning range was approximately 88 megacycles to 98 megacycles over the same range of movement of the tuning bar. In this embodiment successfully tried out in practice, the amplifier tube 16 was an RCA type 5592 tube, and the 50 kilowatt amplifier consisted of three identical amplifiers each of the type shown in Figs. 1, 2 and 3. The anode polarizing voltage was of the order of 7500 volts D. C. The length of the tuning bar 12 measured vertically along the outer wall 12″ was approximately 12½ inches. The spacing between the outer wall 12″ and the outer conductor 11 of the concentric line resonator was about one inch. The outer conductor 11 was about twenty inches square and had a length of approximately 39 inches measured from the base plate 13 to the cover 30.

What is claimed is:

1. A concentric line resonator comprising inner and outer conductors, and a slidable tuning bar for said resonator having first and second spaced metallic walls directly connected together, said first wall being spaced from said inner conductor and provided with two sets of contact fingers at both ends surrounding and engaging said inner conductor, one of said sets of contact fingers being removable, said second wall being longer than said first wall and extending beyond said other set of contact fingers, said second wall of said tuning bar being spaced from said outer conductor by a predetermined distance and forming a capacitor therewith, the length of said first wall of said tuning bar being such that with said one set of contact fingers removed it forms a short-circuited section of line with the inner conductor and whose effective inductive reactance is approximately equal but opposite in sign to the effective capacitive reactance formed by the second wall and the outer conductor, the operating range of the resonator when said one set of fingers is removed being at a different band of frequencies compared to the operating range of said resonator when both sets of contact fingers are in operative position.

2. A concentric line resonator comprising inner and outer vertically arranged hollow conductors, and a tuning chamber surrounding said inner conductor and having first and second vertical walls spaced apart from each other by air but directly connected together, said first wall being spaced from and nearest to said inner conductor and provided at the ends thereof with upper and lower sets of resilient contact fingers which surround and engage said inner conductor, the upper set of said contact fingers being removable, said second wall having greater area than said first wall and extending below said lower set of contact fingers and being spaced from the outer conductor by a predetermined distance, the length of said first wall being such that with the upper set of contact fingers removed it forms a short-circuited section of line with the inner conductor and whose effective inductive reactance is approximately equal but opposite in sign to the effective capacitive reactance formed by the second wall and the outer conductor, the operating range of the resonator when said upper set of fingers is removed being at a lower band of frequencies compared to the operating range of said resonator when both sets of contact fingers are in operative position.

3. A concentric line resonator comprising inner and outer conductors, and a slidable tuning bar for said resonator having first and second spaced metallic walls directly connected together, said first wall being spaced from said inner conductor and provided with two sets of contact fingers at both ends surrounding and engaging said inner conductor, one of said sets of contact fingers being removable, said second wall of said tuning bar being spaced from said outer conductor by a predetermined distance and forming a capacitor therewith and extending beyond said other set of contact fingers, the length of said first wall of said tuning bar being such that with said one set of contact fingers removed it forms a short-circuited section of line with the inner conductor whose effective inductive reactance is approximately equal but opposite in sign to the effective capacitive reactance formed by the second wall and the outer conductor, and means for moving said tuning bar over a portion of the length of said concentric line, said means comprising a plurality of lead screws symmetrically positioned around said tuning bar and secured thereto, a sprocket wheel for each lead screw, and an endless chain engaging all of said sprockets for simultaneously driving said sprockets, the operating range of the resonator when said one set of fingers is removed being at a different band of frequencies compared to the operating range of said resonator when both sets of contact fingers are in operative position.

4. A concentric line resonator comprising inner and outer conductors, and a slidable tuning bar for said resonator having first and second spaced metallic walls directly connected together, said second wall being longer than said first wall, said first wall being spaced from said inner conductor and provided with a set of contact fingers at one end surrounding and engaging said inner conductor, said second wall of said tuning bar being spaced from said outer conductor and forming a capacitor therewith, the lengths of said first and second walls of said tuning bar being such and the spacing between said second wall and said outer conductor being such that with said set of contact fingers in circuit it forms a short-circuited section of line with the inner conductor and whose effective inductive reactance is approximately equal but opposite in sign to the effective capacitive reactance formed by the second wall and the outer conductor.

CHARLES J. STARNER.
THEODORE N. NEWMAN.

REFERENCES CITED

The following references are of record ni the file of this patent:

UNITED STATES PATENTS

| Number | Name | Date |
|---|---|---|
| 2,159,782 | Conklin et al. | May 23, 1939 |
| 2,331,193 | Hutcheson | Oct. 5, 1943 |
| 2,373,233 | Dow | Apr. 10, 1945 |
| 2,392,664 | Gurewitsch | Jan. 8, 1946 |
| 2,405,277 | Thompson | Aug. 6, 1946 |
| 2,426,992 | Folland | Sept. 9, 1947 |
| 2,431,273 | Nergaard | Nov. 18, 1947 |
| 2,434,508 | Okress | Jan. 13, 1948 |
| 2,435,442 | Gurewitsch | Feb. 3, 1948 |
| 2,443,921 | Moe | June 22, 1948 |
| 2,451,876 | Salisbury | Oct. 19, 1948 |